(12) United States Patent
Hrehor et al.

(10) Patent No.: US 11,334,168 B1
(45) Date of Patent: May 17, 2022

(54) KEYBOARD WITH ISOLATED KEY HAPTICS

(71) Applicant: Dell Products, L.P., Round Rock, TX (US)

(72) Inventors: Robert Duane Hrehor, Round Rock, TX (US); Jace W. Files, Round Rock, TX (US); John T. Morrison, Round Rock, TX (US)

(73) Assignee: Dell Products, L.P., Round Rock, TX (US)

(*) Notice: Subject to any disclaimer, the term of this patent is extended or adjusted under 35 U.S.C. 154(b) by 0 days.

(21) Appl. No.: 17/324,483

(22) Filed: May 19, 2021

(51) Int. Cl.
*H01H 13/85* (2006.01)
*G06F 3/01* (2006.01)
*G06F 3/02* (2006.01)

(52) U.S. Cl.
CPC ............ *G06F 3/016* (2013.01); *G06F 3/0202* (2013.01)

(58) Field of Classification Search
None
See application file for complete search history.

(56) References Cited

U.S. PATENT DOCUMENTS

| 2012/0113008 A1* | 5/2012 | Makinen ............. G06F 3/04883 345/168 |
| 2018/0218859 A1* | 8/2018 | Ligtenberg ............ G06F 3/0416 |
| 2019/0019639 A1* | 1/2019 | Lane ..................... H01H 13/85 |

* cited by examiner

*Primary Examiner* — Carl Adams
(74) *Attorney, Agent, or Firm* — Fogarty LLP

(57) ABSTRACT

Systems and methods provide haptic feedback within areas of keyboard using a single haptic device, while isolating the feedback to keys that are being pressed. A keyboard may include multiple key areas. Each key area includes a mechanical actuator. Each key area also includes a sensor layer located below a plurality of haptic key plates and located above the mechanical actuator. Each key area also includes a flexible membrane that dampens haptic feedback and separates each of the haptic key plates from neighboring key plates. Each key area also includes haptic key plates that each include one or more protrusions. When a key plate is pressed, protrusions of the pressed key plate contact the sensor layer to trigger activation of the mechanical actuator to generate haptic feedback. The protrusions of the pressed key plate transmit the generated haptic feedback from the mechanical actuator to the key plate.

20 Claims, 5 Drawing Sheets

KEYBOARD WITH ISOLATED KEY HAPTICS

FIELD

This disclosure relates generally to peripheral devices utilized by Information Handling Systems (IHSs), and more specifically, to keyboards used by IHSs.

BACKGROUND

As the value and use of information continues to increase, individuals and businesses seek additional ways to process and store information. One option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Many types of IHSs may be operated using keyboards that support various key entry inputs by a user of the IHS, such as user inputs to software applications operating on the IHS and user inputs to the operating system of the IHS. In some instances, IHSs, such as desktops and tablets, may utilize external keyboards that may be coupled to the IHS via wired or wireless couplings. Some IHSs, such as laptops include an integrated keyboard. In such IHSs that include integrated keyboards, thinner keyboards may support the construction of thinner IHSs, thus improving the portability of the IHS. Some portable IHSs, such as tablets and dual-screen laptops, may be utilized with external keyboards. Such external keyboards for used with portable IHSs are advantageously thinner, this improving the portability of the external keyboard. In some instances, peripheral devices such as keyboards may support haptic feedback that provides a user of an IHS with sensory feedback, such as mechanical vibrations.

SUMMARY

In various embodiments, Information Handling Systems (IHSs) are configured for providing haptic feedback. The IHSs may include: one or more processors; one or more memory devices coupled to the processors, the memory devices storing computer-readable instructions that are executed by the processors; and a keyboard comprising a plurality of haptic key areas, wherein each key area comprises: a mechanical actuator; a sensor layer located below a plurality of haptic key plates and located above the mechanical actuator; and a plurality of flexible membranes that dampen haptic feedback and separate each of the haptic key plates from neighboring haptic key plates; and the plurality of haptic key plates, wherein each key plate comprises of a plurality of protrusions, and wherein, when a key plate is pressed, one or more of the protrusions of the pressed key plate contact the sensor layer to trigger activation of the mechanical actuator to generate haptic feedback, and wherein the one or more protrusions of the pressed key plate transmit the generated haptic feedback from the mechanical actuator to the key plate.

In additional IHS embodiments, the haptic key area is located along an edge of the keyboard. In additional IHS embodiments, the plurality of flexible membranes are constructed from an elastomer. In additional IHS embodiments, instructions executed by the processors cause the IHS to detect when multiple of the plurality of key plates are pressed simultaneously. In additional IHS embodiments, a strength of the generated haptic feedback is increased based on a number of the key plates that are pressed simultaneously. In additional IHS embodiments, a combined thickness of the mechanical actuator, the sensor layer, the flexible membranes and the key plates is less than 2.2 mm. In additional IHS embodiments, the plurality of flexible membranes that separate each of the haptic key plates from neighboring haptic keys comprise membrane walls and further comprise a connecting portion of the membrane that connects the membrane walls.

In various additional embodiments, keyboards provide key inputs to an Information Handling System (IHS) and provide haptic feedback. The keyboards may include: a plurality of haptic key areas, wherein each haptic key area comprises: a mechanical actuator layer located below the haptic key area; a sensor layer below a plurality of haptic key plates of the haptic key area and above the mechanical actuator; a plurality of flexible membranes that dampen haptic feedback and separate each of the haptic key plates from neighboring haptic key plates; and the plurality of haptic key plates within the haptic key area, wherein each of the key plates comprises a plurality of protrusions, wherein, when a key plate is pressed, one or more of the protrusions of the pressed key plate contact the sensor layer to trigger activation of the mechanical actuator to generate haptic feedback, and wherein the one or more protrusions of the pressed key plate that contact the sensor layer transmit haptic feedback generated by the mechanical actuator to the key plate. In additional keyboard embodiments, the haptic key area is located along an edge of the keyboard. In additional keyboard embodiments, the plurality of flexible membranes are constructed from an elastomer. In additional keyboard embodiments, instructions executed by a logic unit detect when multiple of the plurality of the key plates are pressed simultaneously. In additional keyboard embodiments, a strength of the haptic feedback is increased based on a number of key plates that are pressed simultaneously. In additional keyboard embodiments, a combined thickness of the mechanical actuator, the sensor layer, the flexible membranes and the key plates is less than 2.2 mm. In additional keyboard embodiments, the plurality of flexible membranes that separate each of the haptic key plates from neighboring haptic keys comprise membrane walls and further comprise a connecting portion of the membrane that connects the membrane walls.

In various additional embodiments, methods provide haptic feedback to a user of an IHS (Information Handling System). The methods may include: detecting, by a sensor layer of a haptic key area comprising a plurality of haptic keys, contact from one or more protrusions of a key plate due to the key plate being pressed by a user of the IHS, wherein the sensor layer is located below a plurality of key plates of the haptic key area and above a mechanical actuator of the haptic key area; activating the mechanical actuator of the haptic key area based on the detected contact by the protrusions of the key plate against the sensor layer; and applying a voltage to the mechanical actuator of the haptic key area to generate haptic feedback, wherein the one or more protrusions of the pressed key plate that contact the sensor layer transmit haptic feedback generated by the mechanical actuator to the key plate, and wherein a plurality of flexible membranes separate each of the haptic key plates from neighboring key plates and also dampen transmission of the generated haptic feedback to the neighboring key plates.

In additional method embodiments, the haptic key area is located along an edge of a keyboard of the IHS. In additional method embodiments, the plurality of flexible membranes are constructed from an elastomer. Additional method embodiments may further include detecting when multiple of the plurality of key plates are pressed simultaneously. Additional method embodiments may further include adjusting a strength of the generated haptic feedback based on a number of the key plates that are pressed simultaneously. In additional method embodiments, a combined thickness of the mechanical actuator, the sensor layer, the flexible membranes and the key plates is less than 2.2 mm.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources, such as a Central Processing Unit (CPU) or hardware or software control logic, Read-Only Memory (ROM), and/or other types of nonvolatile memory.

Figure 1:
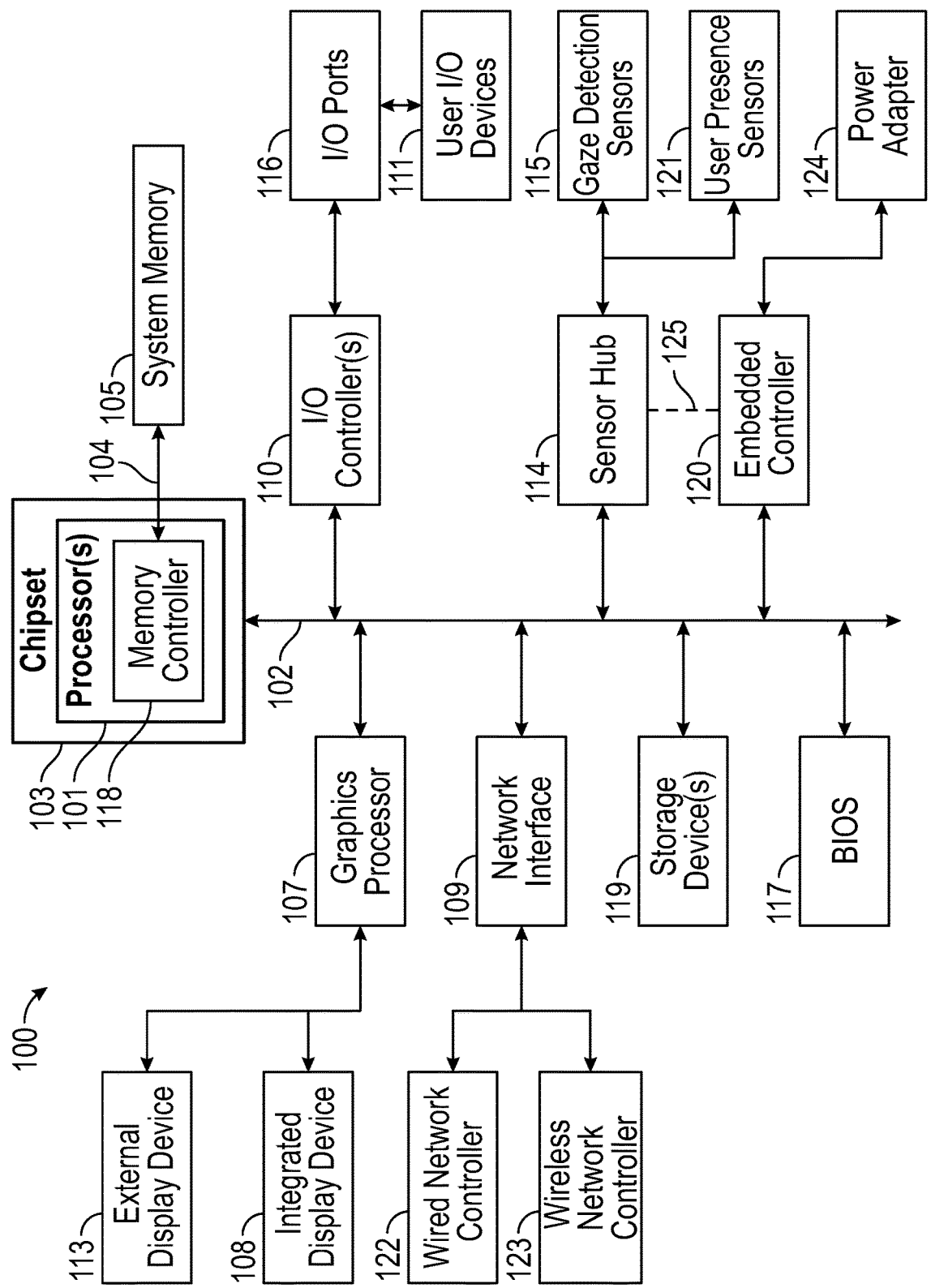
FIG. 1 is a block diagram depicting certain components of an IHS configured according to various embodiments for use with a keyboard supporting isolated key haptics.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below. FIG. 1 shows an example of an IHS configured to implement the systems and methods described herein according to certain embodiments. It should be appreciated that although certain IHS embodiments described herein may be discussed in the context of a personal computing device, other embodiments may be utilized.

FIG. 1 is a block diagram illustrating certain components of an IHS 100 configured according to certain embodiments for use with a keyboard supporting isolated key haptics. IHS 100 includes one or more processors 101, such as a Central Processing Unit (CPU), that execute code retrieved from a system memory 105. Although IHS 100 is illustrated with a single processor 101, other embodiments may include two or more processors, that may each be configured identically, or to provide specialized processing functions. Processor 101 may include any processor capable of executing program instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, the processor 101 includes an integrated memory controller 118 that may be implemented directly within the circuitry of the processor 101, or the memory controller 118 may be a separate integrated circuit that is located on the same die as the processor 101. The memory controller 118 may be configured to manage the transfer of data to and from the system memory 105 of the IHS 100 via a high-speed memory interface 104. The system memory 105 that is coupled to processor 101 provides the processor 101 with a high-speed memory that may be used in the execution of computer program instructions by the processor 101. Accordingly, system memory 105 may include memory components, such as such as static RAM (SRAM), dynamic RAM (DRAM), NAND Flash memory, suitable for supporting high-speed memory operations by the processor 101. In certain embodiments, system memory 105 may combine both persistent, non-volatile memory and volatile memory. In certain embodiments, the system memory 105 may be comprised of multiple removable memory modules.

IHS 100 utilizes a chipset 103 that may include one or more integrated circuits that are connected to processor 101. In the embodiment of FIG. 1, processor 101 is depicted as a component of chipset 103. In other embodiments, all of chipset 103, or portions of chipset 103 may be implemented directly within the integrated circuitry of the processor 101. Chipset 103 provides the processor(s) 101 with access to a variety of resources accessible via bus 102. In IHS 100, bus 102 is illustrated as a single element. Various embodiments may utilize any number of separate buses to provide the illustrated pathways served by bus 102.

As illustrated, a variety of resources may be coupled to the processor(s) 101 of the IHS 100 through the chipset 103. For instance, chipset 103 may be coupled to a network interface 109 that may support different types of network connectivity. In certain embodiments, IHS 100 may include one or more Network Interface Controllers (NIC), each of which may implement the hardware required for communicating via a specific networking technology, such as Wi-Fi, BLUETOOTH, Ethernet and mobile cellular networks (e.g., CDMA, TDMA, LTE). As illustrated, network interface 109 may support network connections by wired network controllers 122 and wireless network controller 123. Each network controller 122, 123 may be coupled via various buses to the chipset 103 of IHS 100 in supporting different types of network connectivity, such as the network connectivity utilized by the operating system of IHS 100. In certain embodiments, network controllers 122 and/or 123 may utilize network I/O ports 116 for establishing network connections with external systems.

Chipset 103 may also provide access to one or more display device(s) 108, 113 via graphics processor 107. In certain embodiments, graphics processor 107 may be comprised within a video card, graphics card or within an embedded controller installed within IHS 100. In certain embodiments, graphics processor 107 may be integrated within processor 101, such as a component of a system-on-chip. Graphics processor 107 may generate display information and provide the generated information to one or more display device(s) 108, 113 coupled to the IHS 100.

The one or more display devices 108, 113 coupled to IHS 100 may utilize LCD, LED, OLED, or other display technologies. Each display device 108, 113 may be capable of receiving touch inputs such as via a touch controller that may be an embedded component of the display device 108, 113 or graphics processor 107, or may be a separate component of IHS 100 accessed via bus 102. In some embodiments, power to graphics processor 107, integrated display device 108 and/or external display 133 may be turned off, or configured to operate at minimal power levels, in response to IHS 100 entering a low-power state. As illustrated, IHS 100 may support an integrated display device 108, such as a display integrated into a laptop, tablet, 2-in-1 convertible device, or mobile device. IHS 100 may also support use of one or more external displays 113, such as external monitors and projectors that may be coupled to IHS 100 via various types of couplings, such as by connecting a cable from the external display 113 to an external I/O port 116 of the IHS 100.

Chipset 103 also provides processor 101 with access to one or more storage devices 119. In various embodiments, storage device 119 may be integral to the IHS 100, or may be external to the IHS 100. In certain embodiments, storage device 119 may be accessed via a storage controller that may be an integrated component of the storage device. Storage device 119 may be implemented using any memory technology allowing IHS 100 to store and retrieve data. For instance, storage device 119 may be a magnetic hard disk storage drive or a solid-state storage drive. In certain embodiments, storage device 119 may be a system of storage devices, such as a cloud drive accessible via network interface 109.

In various embodiments, IHS 100 may include one or more I/O ports 116 the support removeable couplings with various types of peripheral external devices. For instance, I/O 116 ports may include USB (Universal Serial Bus) ports, by which a variety of external devices may be coupled to IHS 100. I/O ports 116 may include various types of physical I/O ports accessible to a user via the enclosure of the IHS 100, where these physical I/O ports support couplings that may connect IHS 100 with external devices and systems, such as couplings established with USB compatible devices via USB ports supported by IHS 100.

In certain embodiments, chipset 103 may utilize one or more I/O controllers 110 that may each support hardware components such as user I/O devices 111. For instance, I/O controller 110 may provide access to one or more user I/O devices 110 such as a keyboard, mouse, touchpad, microphone, speakers, camera and other input and output devices that may be coupled to IHS 100. Each of the supported user I/O devices 111 may interface with the I/O controller 110 through wired or wireless connections. As described in additional detail below, in some embodiments, a user I/O device 110 such as a keyboard supporting one or more haptic key areas with isolated key haptics may be coupled to IHS 100 via an I/O port 116 coupling, such as a USB coupling, or via a wireless coupling.

In supporting a keyboard with isolated key haptics, such as described herein, IHS 100 may utilize one or more device drivers in communicating haptic signals between processor 101 or an I/O controller 110 and one or more haptic feedback devices that provide mechanical feedback upon a user pressing a haptic key of the keyboard. A device driver may include instructions for the operation of mechanical actuators that generate mechanical feedback, such as vibrations, where the generated feedback is transmitted to the user's finger while isolating the feedback to the specific key of the keystroke, such as described in additional detail below. The device driver may also execute various other functions supported by the haptic keyboard. As described in additional detail below, haptic feedback devices supported according to embodiments may include one or more mechanical feedback components, such as a piezoelectric actuators (PEA), of a keyboard, where such actuators may be activated upon a user pressing a key within a group of haptic keys that form a haptic key area of the keyboard, where the feedback generated within a haptic key area is generated by a single actuator, but the feedback is nonetheless isolated to only the haptic keys that are being pressed.

As illustrated, IHS 100 also includes a BIOS (Basic Input/Output System) 117 that may be stored in a non-volatile memory accessible by chipset 103 via bus 102. Upon powering or restarting IHS 100, processor(s) 101 may utilize BIOS 117 instructions to initialize and test hardware components coupled to the IHS 100. The BIOS 117 instructions may also load an operating system for use by the IHS 100. The BIOS 117 provides an abstraction layer that allows the operating system to interface with the hardware components of the IHS 100. The Unified Extensible Firmware Interface (UEFI) was designed as a successor to BIOS. As a result, many modern IHSs utilize UEFI in addition to or instead of a BIOS. As used herein, BIOS is intended to also encompass UEFI. In certain embodiments, the initialization of IHS 100 by BIOS 117 may be paused to allow for the validation of instructions utilized by a trusted component, such as a secure processor, in order to establish a hardware root of trust that includes the trusted component that may then be utilized to support certain secure operations of IHS 100, such as user authentication.

In some embodiments, IHS 100 may include a sensor hub 114 that collects information from various sensors of the IHS 100, such as user presence sensors 121 that may include optical, infrared and sonar sensors, that may provide data used by sensor hub 114 to provide an indication of a user's presence near IHS 100 and may also be used to determine a distance of a user from IHS 100. In some embodiments, such optical, infrared and sonar sensors may also be utilized by sensor hub 114 in supporting xR (virtual, augmented, mixed reality) sessions hosted by the IHS 100. In certain embodiments, sensor hub 114 may be configured to incorporate audio information in determining a user's presence near IHS 1000. For instance, sensor hub 114 may receive information from an audio I/O subsystem that includes ultrasonic audio transmission and reception capabilities. Based on such audio information, sensor hub 114 may determine, at least in part, a user's presence near IHS 100. In a similar manner, sensor hub 114 may also incorporate certain network signal information in determining a user's presence near IHS 100. For instance, sensor hub 114 may utilize the described BLUETOOTH transmission and reception capabilities of IHS 100 in order to detect a user's presence in proximity to IHS 100.

As indicated in FIG. 1, sensor hub 114 may also utilize gaze detection sensors 115 that may be used to determine the direction of a user's gaze. For instance, gaze detection sensors 115 may utilize a camera that captures high-frame-rate images of the user's eyes. In some instances, gaze detection sensors 115 may also project a pattern of infrared or (near-infrared) light on the user's eyes. Based on detected movement of the user's pupil relative to the projected pattern, gaze detection sensors 115 may determine a focus point of the user's gaze. Using this focal point determined by the gaze detection sensors 115, sensor hub 114 may determine whether the user is looking at the IHS 100.

In certain embodiments, sensor hub 114 may be an independent microcontroller or other logic unit that is coupled to the motherboard of IHS 100. In such embodiments, sensor hub 114 may communicate with various sensors and chipset 103 of processor 101 via a bus connection such as an Inter-Integrated Circuit (I2C) bus or other suitable type of multi-master bus connection. In certain embodiments, sensor hub 114 may be a component of an integrated system-on-chip incorporated into processor 101 and may utilize an I2C bus for communicating with sensors, such as the gaze detection sensors 115 and user presence sensors 121. Sensor hub 114 may collect and processes data from such sensors using data fusion techniques in order to determine contextual information regarding the operational state of IHS 100 for use in determining information to be distributed to participants in a collaborative session.

As illustrated, IHS 100 embodiments may utilize an embedded controller 120 that may be a motherboard component of IHS 100 and may include one or more logic units. In certain embodiments, embedded controller 120 may operate from a separate power plane from the main processors 101 and thus from the operating system functions of IHS 100. Firmware instructions utilized by embedded controller 120 may be used to operate a secure execution environment that may include operations for providing various core functions of IHS 100, such as power management, management of operating modes in which IHS 100 may be physically configured (e.g., determining a mode of a convertible laptop IHS based on the current hinge angle of the IHS reported by sensor hub 114) and support for certain integrated I/O functions.

Embedded controller 120 may also implement operations for interfacing with a power adapter 124 in managing power for IHS 100. Such operations may be utilized to determine the power status of IHS 100, such as whether IHS 100 is operating from battery power or is plugged into an AC power source. Embedded controller 120 may also implement operations for detecting any changes to the physical configuration of IHS 100 and managing the modes corresponding to different physical configurations of IHS 100. For instance, in embodiments where IHS 100 is a laptop computer or a convertible laptop computer, embedded controller 120 may receive inputs from a lid position sensor that may detect whether the two sides of the laptop have been latched together to a closed position. In response detecting latching of the lid of IHS 100, embedded controller 120 may initiate operations for shutting down IHS 100 or placing IHS 100 in a low-power state. In certain embodiments, embedded controller 120 may be configured to place IHS 100 in a low-power state based on various conditions, such as based on a detected period of inactivity.

In various embodiments, an IHS 100 does not include each of the components shown in FIG. 1. In various embodiments, an IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 101 as a systems-on-a-chip.

Figure 2A:
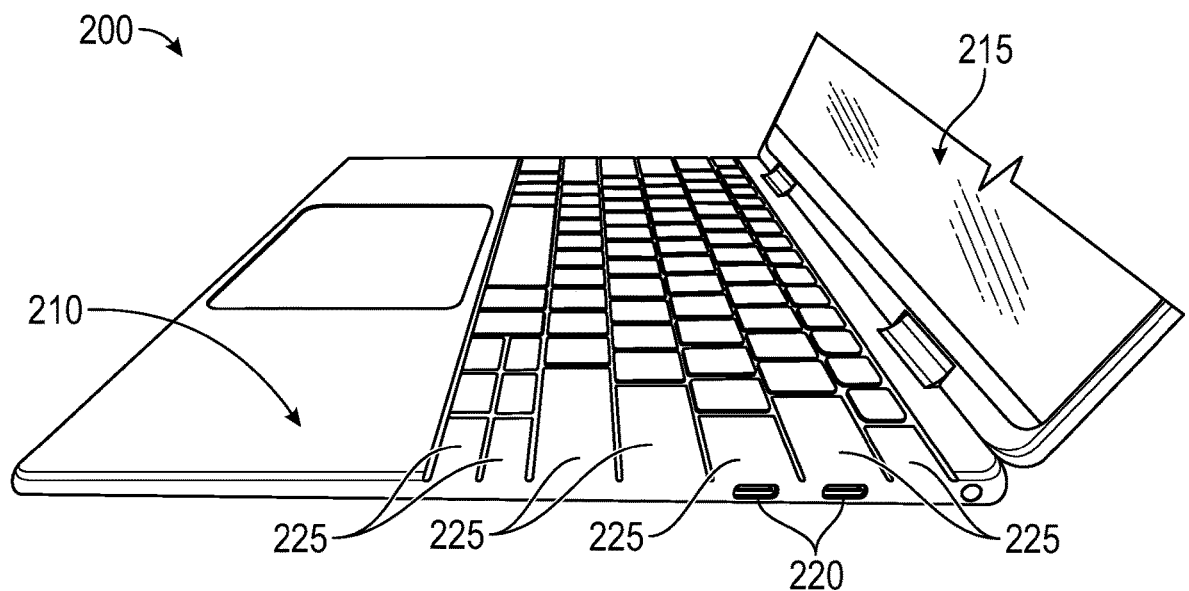
FIG. 2A is an illustration of a laptop that includes an integrated keyboard supporting isolated key haptics according to various embodiments.

FIG. 2A is an illustration of a laptop 200 that includes an integrated keyboard supporting isolated key haptics according to various embodiments. As illustrated, the laptop 200 includes a display panel 215 and a base panel 210 that includes an integrated keyboard. As described with regard to the IHS of FIG. 1, the display panel 215 may include a display screen that utilizes any of various available display technologies. The base panel 210 may house various other of the hardware components of a laptop, such as described with regard to the IHS of FIG. 1. For instance, the base panel 210 may house one or more processors, a rechargeable battery system, cooling systems, storage drives and a variety of other hardware components. As illustrated, the top cover of the base panel 210 includes an integrated keyboard, as well as a palm rest area that includes a trackpad. Also as illustrated, a set of haptic keys 225 are located in a key area along the right side of the integrated keyboard.

As described in additional detail below, the haptic keys 225 that are implemented according to embodiments provide a user with haptic feedback upon pressing one of the haptic keys 225. Embodiments further support isolating the haptic feedback to the particular haptic key 225 that is being pressed, without utilizing a separate haptic actuator for each of the haptic keys. By providing haptic feedback that is isolated to a particular haptic key 225 that is being pressed, a user is provided with feedback that confirms that the user's pressing of a particular haptic key has been detected by the IHS. As described in additional detail below, such positive haptic confirmation of haptic keys 225 being pressed supports efficient use of these keys by users, while also supporting embodiments that effectively utilize a small amount of horizontal key travel in these haptic keys.

Through the use of a small key travel distance by the haptic keys 225, the height profile of these keys may be reduced such that the overall thickness of the side 205 of the base panel 210 may also be reduced. In some instances, the short key travel supported by haptic keys 225 may conserve sufficient space within the base panel 210 such that ports 220 may be included along the side 205 of the base panel 210 below these haptic keys, where such ports 220 could not be accommodated using existing keys without increasing the thickness of the side 205 of the base panel 210. In addition, the small key travel distance supported by haptic keys 225 may allow the horizontal profile of these keys to be reduced such that the tops of these keys 225 are flush, or nearly flush, with the top surface of the base panel 210. As reflected in FIG. 2A, the keys 225 of haptic key area that are flush with the base panel 210 surface may transition in a seamless manner with the side 205 of the base panel. In embodiments where the tops of haptic keys 225 are flush with the base panel 210 surface, the profiles of these keys are thus not visible from the side 205 of the laptop, in particular when the display panel 215 is in a closed position and is latched to the base panel 210. The lack of any visible key profiles along the side 205 of the laptop thus supports the side 205 of the laptop being seamless and rounded in an aesthetically pleasing and distinctive manner.

Figure 2B:
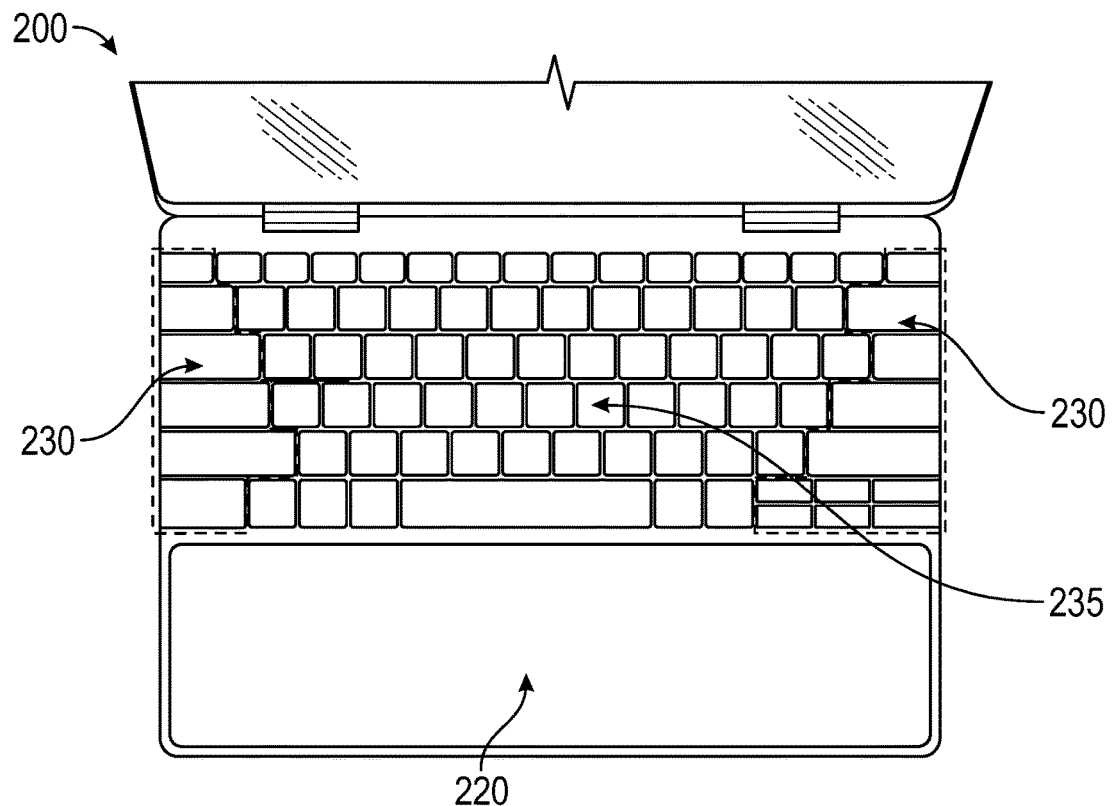
FIG. 2B is an additional illustration of a laptop that includes an integrated keyboard supporting isolated key haptics according to various embodiments.

FIG. 2B is an additional illustration of laptop 200 that includes an integrated keyboard supporting isolated key haptics according to various embodiments. As in FIG. 2A, in FIG. 2B, laptop 200 includes a display panel and a base panel, where the base panel includes a palm rest area 220 and an integrated keyboard that includes a central area 235 without key haptics and two haptic key areas 230. Whereas FIG. 2A illustrates a haptic key embodiment with a haptic key area that is located along the right side of an integrated keyboard, FIG. 2B illustrates the use of haptic key areas 230 that are located along both the left and right sides of an integrated keyboard, with the central area 235 including keys that are implemented utilizing existing technologies. Accordingly, the haptic key areas 230 on each end of the integrated keyboard support limited thickness of both the sides of the base panel 210, such with side 205 of FIG. 2A. The limited thickness, provided by embodiments, of the sides of the laptop thus provides room for I/O and/or power ports on both sides of the laptop, while also supporting seamless, rounded edges on both the sides of the base panel 210.

In the illustrated embodiment, the haptic key areas 230 each include the keys that are located along a respective edge of the integrated keyboard. As such, all of the keys on the left edge of the integrated keyboard are included in one haptic area on the left, and all of the keys on the right edge of the integrated keyboard are included in another haptic area on the right. As indicated in FIG. 2B, the key area on the right of the keyboard includes the keys that border the right edge of the keyboard and also includes keys that are logically related to these keys, such as all of the arrow and page navigation keys that are part of logical cluster of keys that are all included in this key area. As described in additional detail below, the haptic feedback for the haptic keys in each of these areas 230 may be generated using a single mechanical actuator. Accordingly, in various embodiments, the haptic feedback generated for the left key area is generated by a single mechanical actuator and the haptic feedback generated for the right key area is generated by a separate, single mechanical actuator. By utilizing a single mechanical actuator for all of the keys within a haptic key area 230, embodiments thus support haptic feedback more economically than haptic feedback systems that utilize a separate mechanical actuator each individual haptic key. As described in additional detail below, embodiments further support isolating the haptic feedback that is experienced by a user in each individual haptic key, thus providing the user with precise tactile keystroke feedback that is not felt by the user in neighboring keys.

The illustrated embodiment utilizes two haptic key areas 230. Other embodiments may utilize any number of haptic key areas that may be of any geometry in which a keyboard may be subdivided. Although, the low profile for keys that is supported by embodiments is particularly advantageous along the edges of a laptop with an integrated keyboard, other portions of an integrated keyboard may also be divided into haptic key areas, where the feedback in each separate haptic key area is driven by a separate and single mechanical actuator. Accordingly, in some embodiments, a complete integrated keyboard may be implemented using the haptic key areas described herein. Although only laptop embodiments are illustrated, external keyboards, such as those utilized in support of tablets and dual-screen laptops, may also be implemented using the described haptic key areas, thus supporting a low profile and rounded edges for the external keyboard.

Figure 3A:
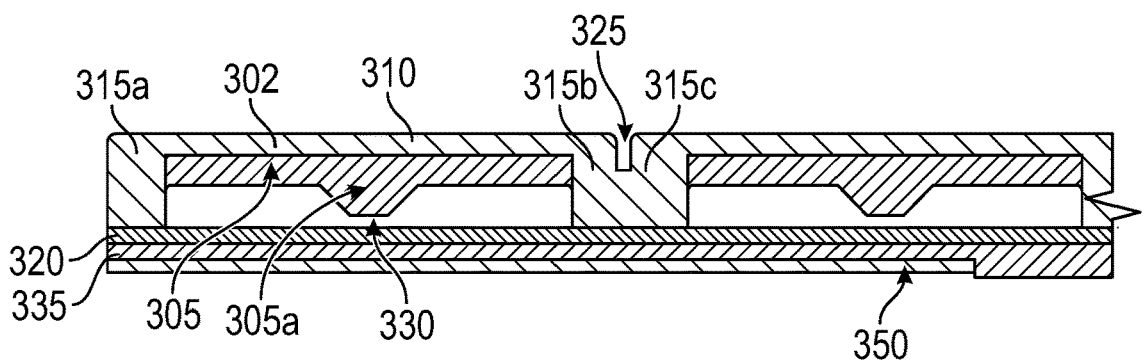
FIG. 3A is a cross-section illustration of a portion of a keyboard supporting isolated key haptics according to various embodiments.

FIG. 3A is a cross-section illustration of a portion of a keyboard supporting isolated key haptics according to various embodiments. In particular, FIG. 3A illustrates a cross-section of the internal components used to construct haptic keys that are part of a haptic key area, such as described above. As keys that are part of the same haptic key area, the haptic feedback for these keys is generated by a single mechanical actuator. In the embodiment of FIG. 3A, the mechanical actuator 350 that drives the feedback for the illustrated keys of a key area is installed within a cavity of a base plate 335 on which the remaining components of the haptic key area are stacked. In some embodiments, a base plate 335 is not utilized and the mechanical actuator 350 may itself serve as the base layer of a haptic key area.

As indicated in FIG. 3A, a sensor layer 320 may be installed on top of the base plate 335. In some embodiments, the sensor layer 320 may be a sheet that is of the same shape of the base plate 335 and fully covers the base plate when the sensor layer is stacked on the base plate. Also as indicated in FIG. 3A, each individual haptic key according to embodiments may be formed from flexible membranes 315*a-c* that separate each of the haptic keys from neighboring haptic keys. In forming an individual haptic key, vertical flexible membranes 315*a* and 315*b* may be placed on the sensor layer 320 such that a cavity is created between the two vertical walls of the membrane. In the embodiment of FIG. 3A, the vertical portions 315*a-b* of the flexible membrane are joined by a horizontal connecting portion 302 that spans the cavity created between the vertical portions 315*a-b*. As illustrated in additional detail with regard to FIGS. 4A and 4B, in some embodiments, the flexible membrane 315*a-c*, 302 for a haptic key area may be formed from a single membrane sheet that fits over the sensor layer and that is constructed to include the structures described herein.

In some embodiments, the top of the flexible membrane 315*a-c*, 302 may be covered with a keycap 310 that protects the flexible membrane and is selected to provide a suitable surface for keystrokes. The keycap may thus include printing and/or embossing that identifies a key and that may include a border that provides a tactile demarcation of the key. In some embodiments, the keycaps 310 for a haptic key area may be integral to the top cover of a laptop or external keyboard. As illustrated in FIG. 3A, the structures of a flexible membrane 315*a-c*, 302 may include an indentation 325 that may serve to demarcate boundaries between neighboring keys. In some embodiments, no indentation may be present between the neighboring keys. Some embodiments may include indentations 325 only between boundaries between neighboring keys of a haptic key area and does not include indentations along the outer boundaries of the key area, such as along the sides of keys that border the left and right edges of the keyboard. In some embodiments, the size of the indentation 325 between neighboring keys may be selected to improve dampening of mechanical feedback to individual haptic keys.

Within the cavity formed by the vertical walls of the flexible membrane 315a and 315b, a key plate 305 may be inserted and may be fixed to the connecting membrane 302, such as with an adhesive. In various embodiments, a key plate 305 may be formed from a plastic or metallic material that provides a stiff surface for receiving user keystrokes. As illustrated in FIG. 3A, a plate 305 from which a key is formed may include a protrusion 305a that, when the key plate 305 is installed within the cavity between the vertical membrane walls 315a-b, the protrusion extends downward into the cavity created by the walls 315a-b. In FIG. 3A, the key is illustrated in a rest state and is thus not being pressed by user. Accordingly, in this rest state, an air gap 330 is present between the protrusion 305a of the key plate and the sensor layer 320, where the size of this air gap 330 corresponds to the key travel necessary for a keystroke to be successfully detected.

Figure 3B:
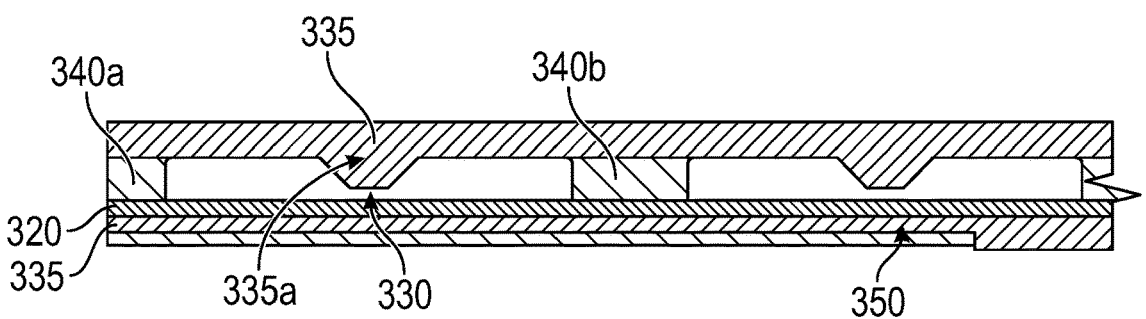
FIG. 3B is a cross-section illustration of a portion of a keyboard supporting isolated key haptics according to various additional embodiments.
Figure 3C:
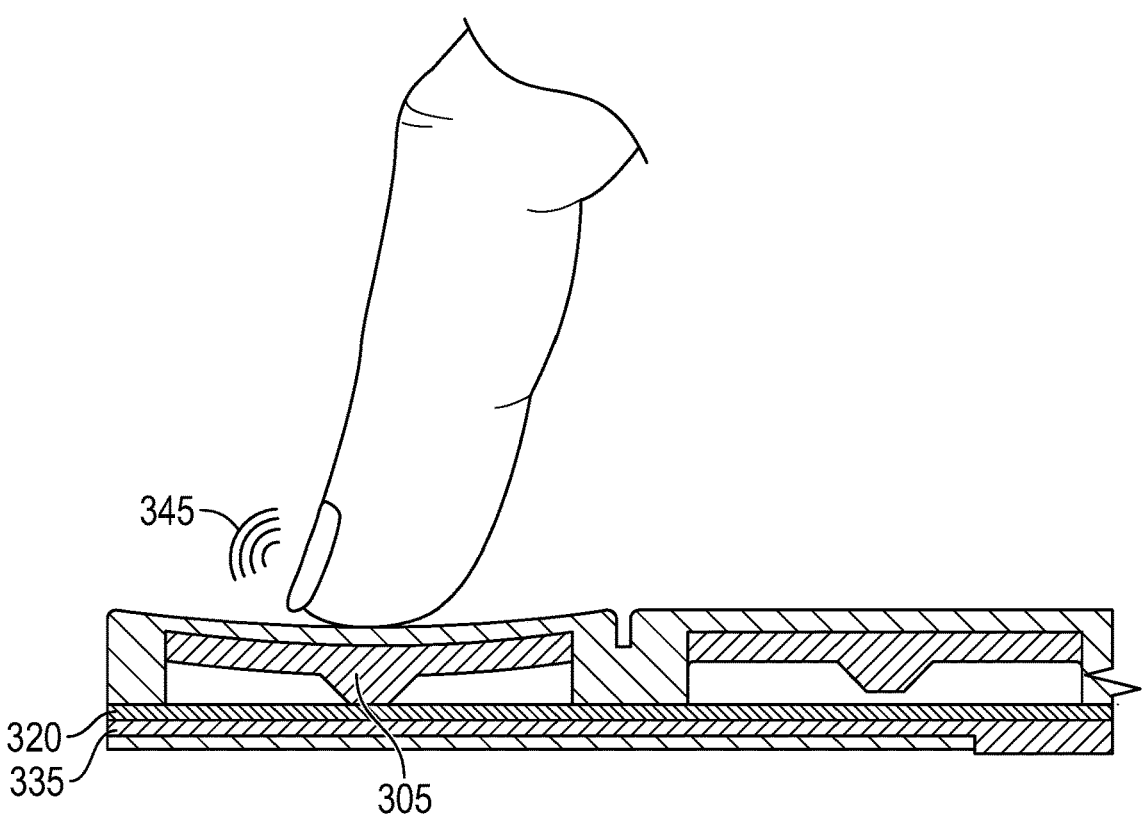
FIG. 3C is a cross-section illustration of the operation of a haptic key of a keyboard supporting isolated key haptics according to various embodiments.

As illustrated in FIG. 3C, upon a user pressing the illustrated key, the connecting membrane 302 deflects, thus allowing the key plate 305 to be pushed downward such that protrusion 305a makes contact with the sensor layer 320. In some embodiments, the key plate 305 may also deflect to some degree based on the pressure of a keystroke such that protrusion 315a is projected downward by the keystroke. Upon detecting contact from protrusion 305a, the sensor layer 320 may generate a signal indicating the detection of a keystroke. In response to detection of the keystroke, the mechanical actuator 350 may be activated and may be energized in a manner that creates mechanical feedback, such as vibrations, pulses and clicks. In some embodiments, the mechanical actuator 350 may continue to generate mechanical feedback as long as the protrusion 305a is detected in contact with sensor layer 320. In some embodiments, the feedback generated by mechanical actuator 350 may be localized to a portion of the actuator that sits below the location of the sensor layer 320 that has detected the contact by a protrusion 305a of the key plate 305.

Once the mechanical actuator 350 is energized, the mechanical feedback 345 is transmitted to the key plate 305 through the protrusion 305a that is in contact with the sensor layer 320. Since the protrusion of only this particular key that is being pressed is in contact with the sensor layer 320, mechanical feedback from the actuator 350 is only transmitted to this particular key. This contributes to isolating generated haptic feedback to the individual key that is being pressed. The haptic feedback transmitted to the key plate 305 via the protrusion 305a is further isolated due to the flexible membranes 315a-b that separate the haptic key from neighboring haptic keys. In some embodiments, the vertical walls of the flexible membrane 315a-b may be constructed from an isomer or other material that dampens movement. In particular, the materials used to form the vertical walls 315a-b of the flexible membrane may be selected to dampen vibration feedback generated at the particular strength and frequency of the feedback that is generated by the mechanical actuator 350. In some embodiments, the dimensions of the structures of the flexible membrane 315a-c may be selected in order to sufficiently damp mechanical feedback transmitted to the key plates 305. In some embodiments, the thickness of the connecting membrane 302 may be selected such that it effectively connects the walls 315a-b of a membrane and creates a cavity between the walls, but is sufficiently thin to provide minimal dampening of mechanical feedback between the key plate 305 and the key cap 310.

The dampening of mechanical feedback by the vertical walls 315a-b serves to further isolate the feedback to an individual key plate 305 that has been pressed by a user. By isolating feedback to individual keys in this manner, the user is provided with precise haptic feedback that positively confirms that the user's keystroke has successfully engaged a key. Such haptic feedback in response to a keystroke may be particularly useful in scenarios where key travel is small distance, such as in the low-profile haptic keys supported by embodiments.

In some instances, a user may press multiple keys of a keyboard simultaneously, such as to activate certain functions of an operating system or to perform certain specially defined functions, such as customized keystroke shortcuts used within software applications. Embodiments may detect such instances where multiple haptic keys within a haptic key area are pressed simultaneously. In some embodiments, a driver or other set of instructions, such as firmware instructions implemented by an I/O controller, may receive notification from sensor layer 320 of a detected contact by a protrusion 305a of a haptic key, thus indicating a user keystroke. In response to a detected keystroke, the instructions may be used to apply a selected voltage to the mechanical actuator, thus generating mechanical feedback of a selected strength that is felt by the user. In response to detecting multiple simultaneous keystrokes within the same haptic key area, the instructions may increase the selected voltage that is applied to the mechanical actuator, thus increasing the mechanical feedback that is generated. In some embodiments, the strength of the mechanical feedback generated by the mechanical actuator 320 may increase according to the number of haptic keys of a key area that are pressed simultaneously. Accordingly, keystroke combinations that involve multiple haptic keys will result in stronger mechanical feedback being provided to the user, thus providing the user with additional feedback that confirms that all keys of a particular keystroke combination have been successfully detected. In instances where keystroke combinations span multiple key areas, such as simultaneously pressing CTRL and ALT on the left of the keyboard of FIG. 2B and DEL on the right side of the keyboard, the strength of the haptic feedback in both of the key areas 230 may be increased accordingly.

FIG. 3B is a cross-section illustration of a portion of a keyboard supporting isolated key haptics according to various additional embodiments. As with the portion of the keyboard illustrated in FIG. 3A, the embodiment of FIG. 3B also includes a key plate 335 that includes a protrusion 335a that contacts a sensor layer 320 when the key is pressed by a user such that the protrusion 335a traverses an air gap 330 that separates the protrusion 335a from the sensor layer when the key is in the illustrated rest position. Also as with the embodiment of FIG. 3A, in the embodiment of FIG. 3B, detection of contact by a protrusion 335a results in the sensor layer 320 signaling the detection of a keystroke, which results in activation of a mechanical actuator 350 that may be incorporated within a cavity of the base plate 335, where the base plate may serve to define the haptic key area in which the feedback is driven by mechanical actuator 350.

Upon detecting a keystroke and activating mechanical actuator 350, the generated mechanical feedback is transmitted to the key plate 335 via the contact by the protrusion 335a with the sensor layer 320. As in the embodiment of FIG. 3A, the embodiment of FIG. 3B includes flexible membrane walls 340a and 340b that separate the haptic key from neighboring haptic keys. As described above, such flexible membranes 340a-b may be constructed of an isomer or other material that dampens mechanical feedback, such as vibrations generated by mechanical actuator 350, in isolating the feedback to an individual key plate 335 that is being pressed. However, in the embodiment of FIG. 3A the flexible membrane walls 340*a-b* that separate the haptic keys are not joined by a connecting membrane 302. As such, rather than inserting the key plate within a cavity created by the walls 315*a-b* and connecting membrane 302, in the embodiment of FIG. 3B, the key plate 335 is positioned on top of the flexible membrane walls 340*a-b*. In some embodiments, the key plate 335 for each key may be a separate component that is individually installed, while in other embodiments, all of the key plates of a haptic key area may consist of a single structure. In such embodiments, individual keys that form the structure may be identified by indentations or by lines scored on the surface of the structure. In such embodiments, the indentations and/or scoring on the surface of the key plate structure may also serve to provide freedom of movement that allows individual key plates 335 to be pressed, and in some cases to deflect, without affecting neighboring haptic keys. In some embodiments, the key plates 335 may be covered by a keycap that includes printing and/or embossing that identifies a key and that may include a border that provides a tactile demarcation of the key.

Figure 4A:
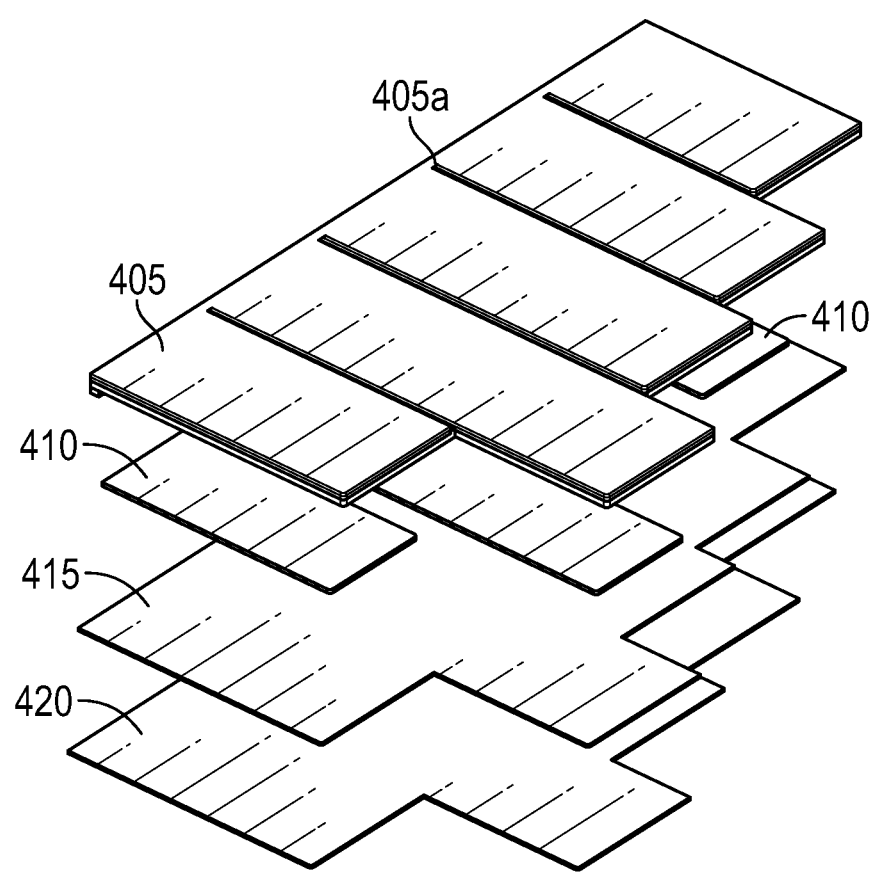
FIG. 4A is a top-view illustration of layers that form, according to various embodiments, isolated haptic keys of a keyboard.
Figure 4B:
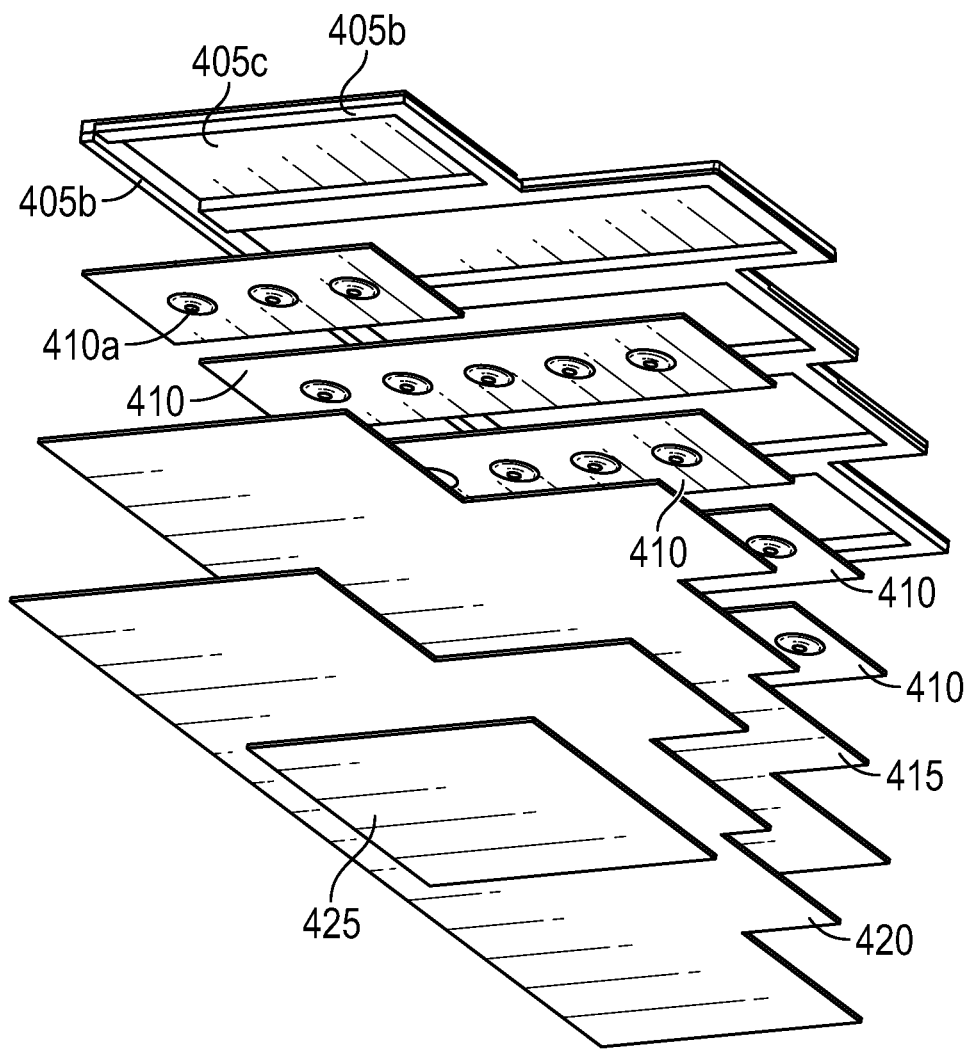
FIG. 4B is a bottom-view illustration of the layers of FIG. 4A that form, according to various embodiments, isolated haptic keys of a keyboard.

FIG. 4A is a top-view illustration of layers that form, according to various embodiments, isolated haptic keys of a keyboard. As described, embodiments support haptic keys that are located within a haptic key area in which the haptic feedback is driven by a single mechanical actuator, while isolating the haptic feedback to the particular haptic keys that are being pressed by a user. In FIG. 4A, a top view of the layers of a haptic key area are illustrated, such as a haptic key area that is located along the left edge of a keyboard. As described, a haptic key area may be formed using a base plate 420 that may define the size and geometry of the haptic key area. FIG. 4B is a bottom-view illustration of the layers of FIG. 4A that form, according to various embodiments, isolated haptic keys of a keyboard. As illustrated in the bottom view of FIG. 4B, a mechanical actuator 425 may be fixed to the bottom of the base plate 420. In some embodiments, the mechanical actuator 425 may be located within a cavity of the base plate 420 such that the mechanical actuator 425 is nested within the base plate 420 and does not increase its thickness. In some embodiments, a separate base plate 420 may not be utilized and instead a mechanical actuator 425 may serve as a base plate. In some embodiments, mechanical actuator 425 may be a piezoelectric actuator (PEA) that includes layers that expand in response to an input voltage. When the voltage is removed, the piezoelectric layers shrink back to a rest state. The expansion and contraction of the various piezoelectric layers of a PEA resulting from the modulation of an applied voltage creates a vibration, click, or other mechanical sensation that may be felt by a user. Upon applying a modulated voltage to the mechanical actuator 425, a vibration may be generated, thus generating a vibration within the base plate 420.

As illustrated both in FIG. 4A and FIG. 4B, a sensor layer 415 may be stacked upon the base plate 420 such that it is positioned to detect contact from protrusions 410*a* of the key plates 410 that are installed above the sensor layer 415. In various embodiments, sensor layer 415 may be a force or capacitive sensor that generates an electrical output upon detecting a contact, such as from a protrusion of a key plate. As illustrated, each of the key plates 410 may include multiple protrusions 410*a* that may be dispersed along the length of a respective key plate 410. Depending on the positioning of a user's finger during a keystroke, one or more of these protrusions 410*a* may be pressed downward until contacting the sensor layer 415, thus activating the mechanical actuator 425 and providing a pathway by which the generated mechanical feedback is transmitted to the key plate 410 and consequently to the user's finger. Various embodiments may utilize different shapes and geometries for the protrusions 410*a* of the key plates 410.

As described with regard to FIG. 3A, a haptic key area may be constructed using a flexible membrane 405. As illustrated in FIG. 3A and also in FIG. 4A, the top surface of the flexible membrane may include indentations 405*a* that separate adjacent haptic keys, thus demarcating the individual haptic keys of the key area. Also as described with regard to FIG. 3A, the individual keys of a haptic key area may be separated by the walls 405*b* of the flexible membrane 405. As described, the flexible membrane 405 may be constructed from materials such as an isomer that dampen mechanical feedback, such as vibrations, thus isolating the generated haptic feedback to an individual key plate 410 that is being pressed by a user. As reflected in FIG. 4B, the thickness of the walls 405*b* may vary based on whether the wall separates a key from a border of the key area or from a neighboring haptic key. In particular, thicker membrane walls 405*b* may be utilized for walls between neighboring haptic keys.

Also as described with regard to FIG. 3A, the walls 405*b* of the flexible membrane may be joined by a connecting membrane 405*c* such that a cavity is formed between the walls 405*b* of the flexible membrane. In such embodiments, the size of the created cavity and the size of the individual key plates 410 may be selected such that each of the key plates 410 may be installed within a cavity of the flexible membrane 405. In some embodiments, each key plate 410 may be fixed within a cavity, such as through the use of an adhesive that attaches the key plate to the connecting membrane 405*c*. Once the key plates 410 have been installed within cavities of the flexible membrane 405 and the flexible membrane is fixed to the sensor layer 415, an air gap remains between the sensor layer and the protrusions 410*a* on the bottom surface of each key plate 410, such as illustrated in the assembled haptic keys of FIG. 3A.

As described, embodiments support low-profile haptic keys that may utilize a small key travel distance, thus allowing such haptic keys to be utilized along the edges of an integrated laptop keyboard in a manner that accommodates I/O and/or power ports along the edges of the laptop while also reducing the thickness of the sides of the laptop, or of an external keyboard implemented according to embodiments. In some embodiments, low-profile haptic keys may be implemented that are approximately 2.11 mm thick. For instance, with regard to the embodiment illustrated in FIG. 3A, a base plate 335 that includes mechanical actuator 350 may be utilized that is 0.36 mm thick. A sensor layer 320 may be utilized that is 0.15 mm thick. A key plate 305 may be utilized that is 0.8 mm thick (including the protrusions 305*a* of the key plate). An air gap 320 of 0.3 mm may be utilized, which corresponds to the key travel distance. A connecting membrane 302 of 0.5 mm may be utilized. Based on these dimensions, the layers of FIG. 3A may be supported while providing a haptic key that is 2.11 mm thick. Accordingly, the layers of the embodiment of FIG. 3B may be supported while a providing a still thinner haptic key that is 1.61 mm thick, due to the lack of a connecting membrane 302.

* * *

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) configured for providing haptic feedback, the IHS comprising:
   one or more processors;
   one or more memory devices coupled to the processors, the memory devices storing computer-readable instructions that are executed by the processors; and
   a keyboard comprising a plurality of haptic key areas each corresponding to a footprint of two or more keys of the keyboard, wherein each key area comprises:
      a mechanical actuator layer extending throughout a footprint of a respective haptic key area;
      a sensor layer also extending throughout the footprint of the respective haptic key area and located below a plurality of haptic key plates and located above the mechanical actuator; and
      a plurality of flexible membranes that dampen haptic feedback and separate each of the haptic key plates from neighboring haptic key plates; and
      the plurality of haptic key plates, wherein each key plate comprises of a plurality of protrusions, and wherein, when a key plate is pressed, one or more of the protrusions of the pressed key plate contact the sensor layer to trigger activation of the mechanical actuator layer to generate haptic feedback that is localized within the mechanical actuator layer at a position of the pressed key plate, and wherein the one or more protrusions of the pressed key plate transmit the generated haptic feedback from the mechanical actuator to the key plate.

2. The IHS of claim 1, wherein one or more of the haptic key areas are located along an edge of the keyboard and comprise a seamless transition between a side of the IHS and key plates of the one or more haptic keys areas.

3. The IHS of claim 1, wherein the plurality of flexible membranes are constructed from an elastomer.

4. The IHS of claim 1, wherein instructions executed by the processors cause the IHS to detect when multiple of the plurality of key plates are pressed simultaneously.

5. The IHS of claim 4, wherein a strength of the generated haptic feedback is increased based on a number of the key plates that are pressed simultaneously.

6. The IHS of claim 1, wherein a combined thickness of the mechanical actuator, the sensor layer, the flexible membranes and the key plates is less than 2.2 mm.

7. The IHS of claim 1, wherein the plurality of flexible membranes that separate each of the haptic key plates from neighboring haptic keys comprise membrane walls and further comprise a connecting portion of the membrane that connects the membrane walls.

8. A keyboard for providing key inputs to an Information Handling System (IHS) and for providing haptic feedback, the keyboard comprising:
   a plurality of haptic key areas each corresponding to a footprint of two or more keys of the keyboard, wherein each haptic key area comprises:
      a mechanical actuator layer extending throughout a footprint of a respective haptic key area and located below the haptic key area;
      a sensor layer also extending throughout the footprint of the respective haptic key area and located below a plurality of haptic key plates of the haptic key area and above the mechanical actuator;
      a plurality of flexible membranes that dampen haptic feedback and separate each of the haptic key plates from neighboring haptic key plates; and
      the plurality of haptic key plates within the haptic key area, wherein each of the key plates comprises a plurality of protrusions, wherein, when a key plate is pressed, one or more of the protrusions of the pressed key plate contact the sensor layer to trigger activation of the mechanical actuator to generate haptic feedback that is localized within the mechanical actuator layer at a position of the pressed key plate, and wherein the one or more protrusions of the pressed key plate that contact the sensor layer transmit haptic feedback generated by the mechanical actuator to the key plate.

9. The keyboard of claim 8, wherein one or more of the haptic key areas are located along an edge of the keyboard and comprise a seamless transition between a side of the IHS and key plates of the one or more haptic keys areas.

10. The keyboard of claim 8, wherein the plurality of flexible membranes are constructed from an elastomer.

11. The keyboard of claim 8, wherein instructions executed by a logic unit detect when multiple of the plurality of the key plates are pressed simultaneously.

12. The keyboard of claim 11, wherein a strength of the haptic feedback is increased based on a number of key plates that are pressed simultaneously.

13. The keyboard of claim 8, wherein a combined thickness of the mechanical actuator, the sensor layer, the flexible membranes and the key plates is less than 2.2 mm.

14. The keyboard of claim 8, wherein the plurality of flexible membranes that separate each of the haptic key plates from neighboring haptic keys comprise membrane walls and further comprise a connecting portion of the membrane that connects the membrane walls.

15. A method for providing haptic feedback to a user of an IHS (Information Handling System), the method comprising:
 detecting, by a sensor layer of a haptic key area corresponding to a footprint of two or more keys of the keyboard and comprising a plurality of haptic keys, contact from one or more protrusions of a key plate due to the key plate being pressed by a user of the IHS, wherein the sensor layer is located below a plurality of key plates of the haptic key area and above a mechanical actuator layer extending throughout a footprint of the haptic key area;
 activating the mechanical actuator of the haptic key area based on the detected contact by the protrusions of the key plate against the sensor layer; and
 applying a voltage to the mechanical actuator of the haptic key area to generate haptic feedback that is localized within the mechanical actuator layer at a position of the pressed key plate, wherein the one or more protrusions of the pressed key plate that contact the sensor layer transmit haptic feedback generated by the mechanical actuator to the key plate, and wherein a plurality of flexible membranes separate each of the haptic key plates from neighboring key plates and also dampen transmission of the generated haptic feedback to the neighboring key plates.

16. The method of claim 15, wherein one or more of the haptic key area is areas are located along an edge of the keyboard and comprise a seamless transition between a side of the IHS and key plates of the one or more haptic keys areas.

17. The method of claim 15, wherein the plurality of flexible membranes are constructed from an elastomer.

18. The method of claim 15, further comprising detecting when multiple of the plurality of key plates are pressed simultaneously.

19. The method of claim 18, further comprising adjusting a strength of the generated haptic feedback based on a number of the key plates that are pressed simultaneously.

20. The method of claim 15, wherein a combined thickness of the mechanical actuator, the sensor layer, the flexible membranes and the key plates is less than 2.2 mm.

* * * * *